Aug. 25, 1931.  E. A. SPERRY  1,820,505
FISSURE DETECTOR FOR METALS
Filed Aug. 10, 1928  3 Sheets-Sheet 1
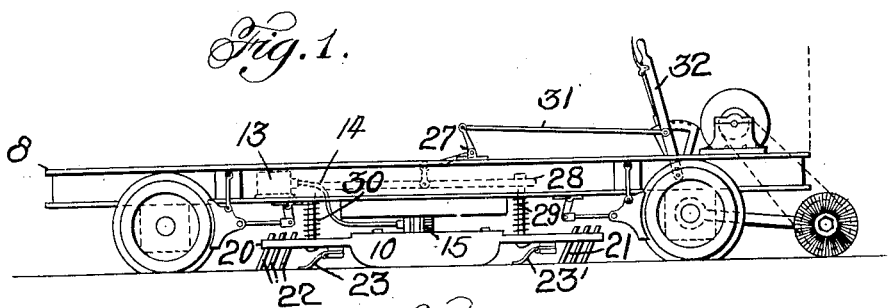
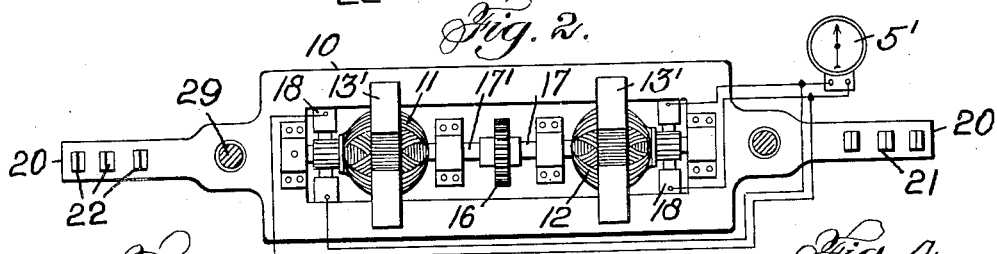
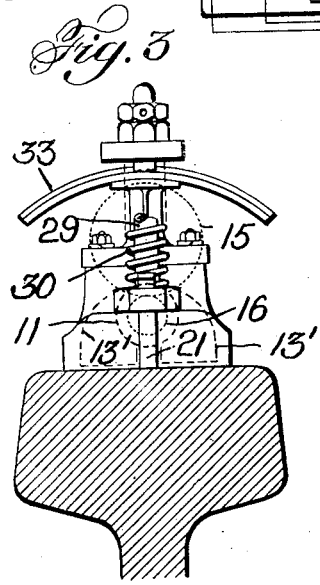
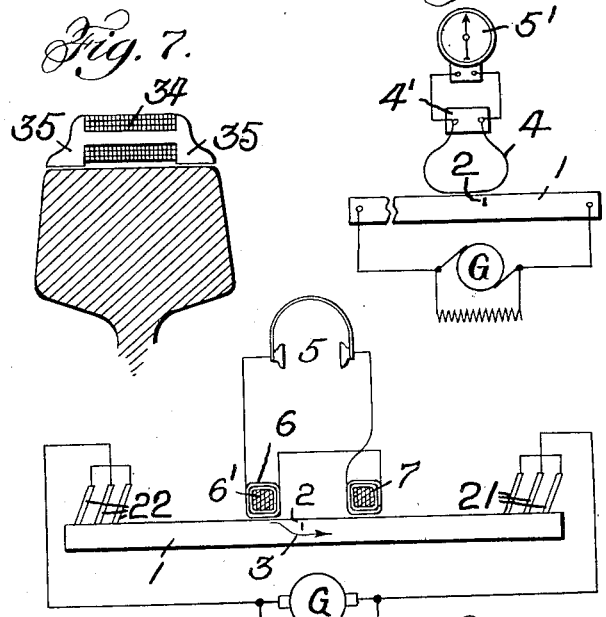
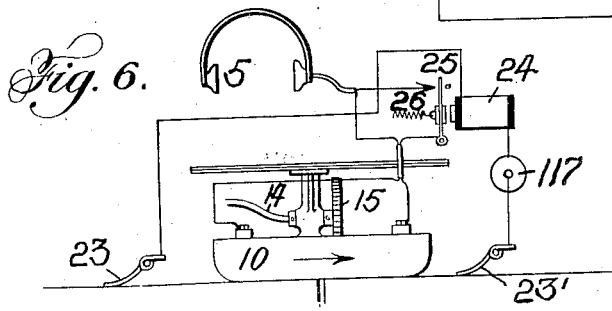
INVENTOR
ELMER A. SPERRY.
BY
Herbert H. Thompson
his ATTORNEY.

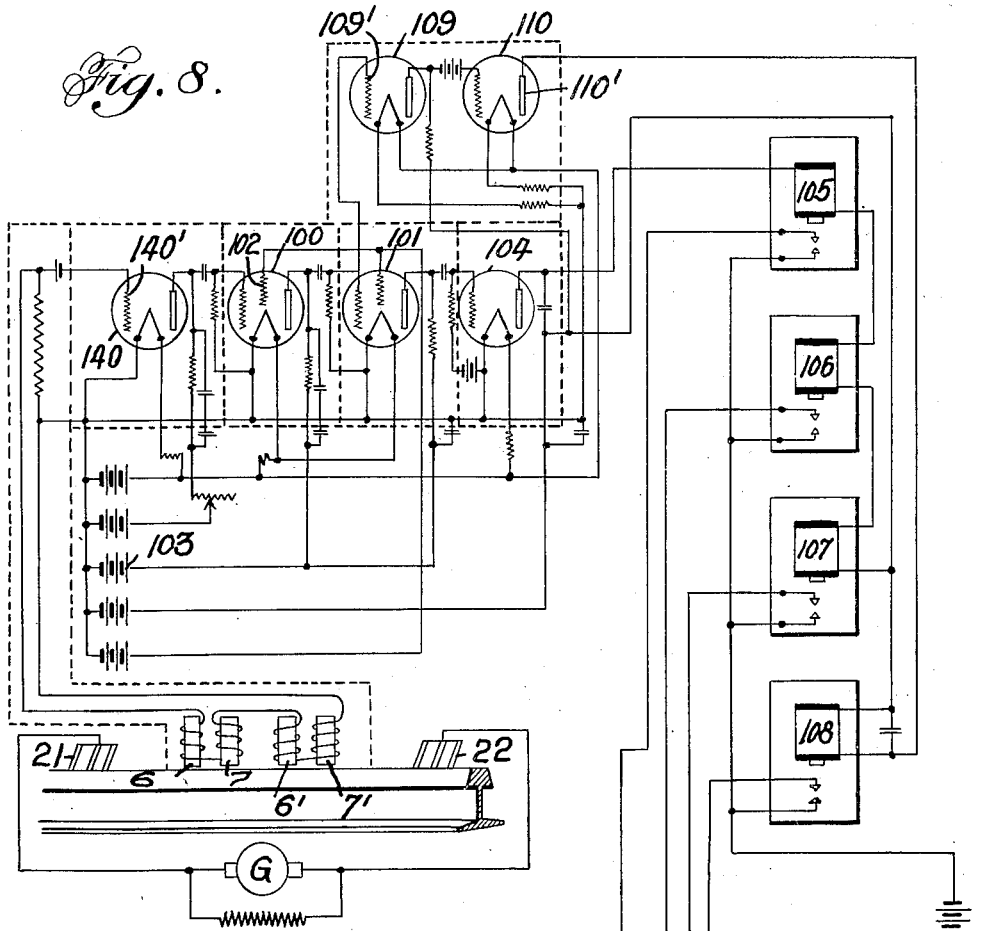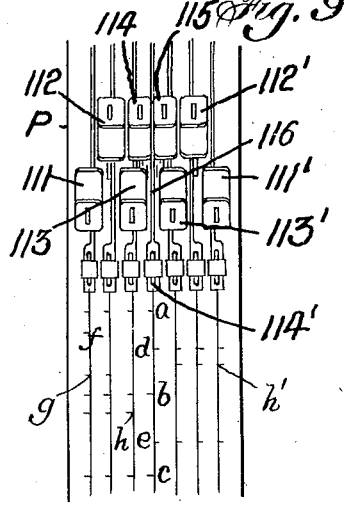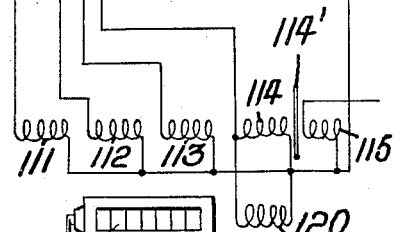

Aug. 25, 1931.  E. A. SPERRY  1,820,505
FISSURE DETECTOR FOR METALS
Filed Aug. 10, 1928   3 Sheets-Sheet 3
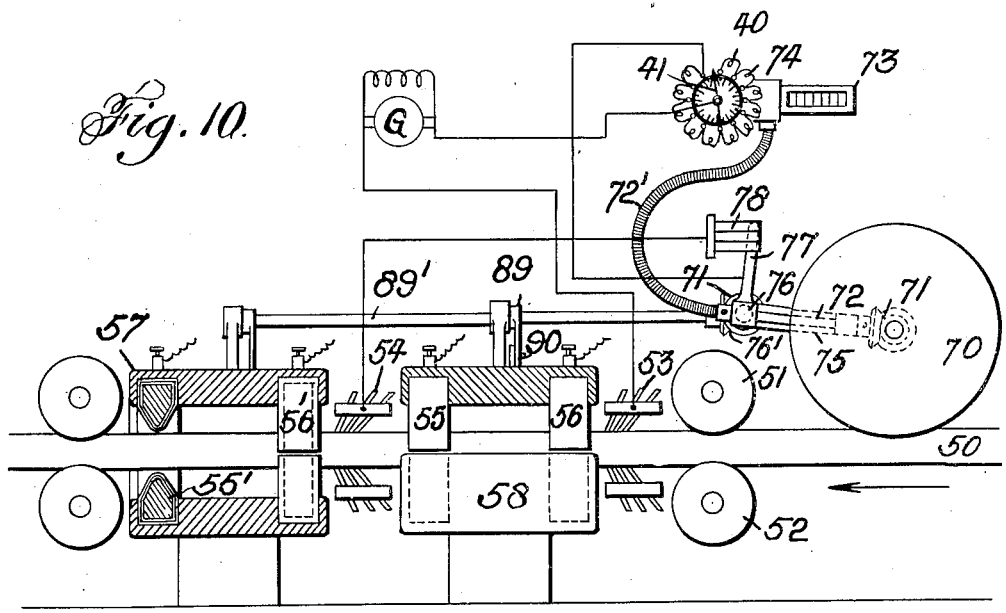
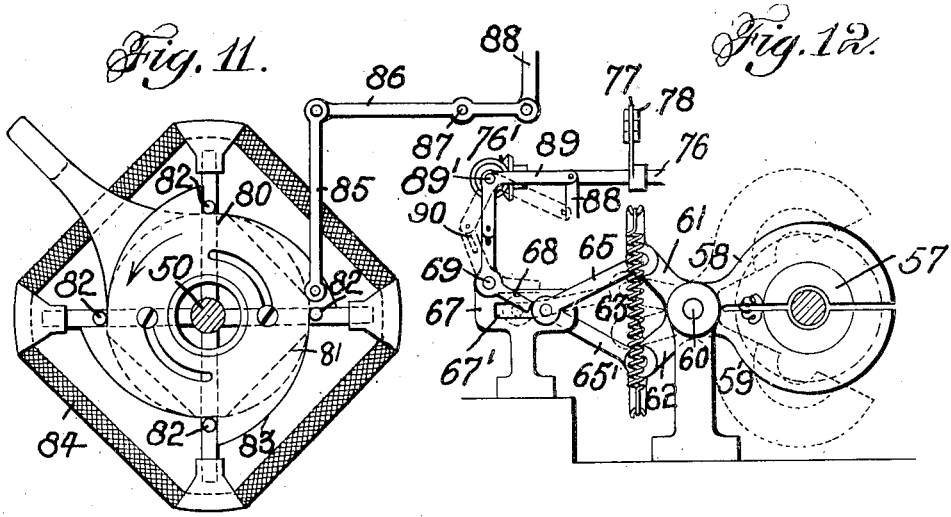
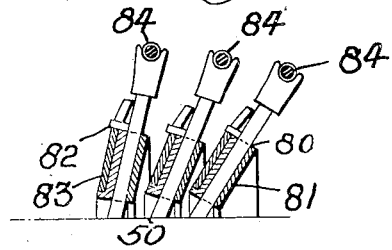
INVENTOR
ELMER A. SPERRY.
BY
Herbert H. Thompson
his ATTORNEY.

Patented Aug. 25, 1931

1,820,505

UNITED STATES PATENT OFFICE

ELMER A. SPERRY, OF BROOKLYN, NEW YORK, ASSIGNOR TO SPERRY DEVELOPMENT COMPANY, OF DOVER, DELAWARE, A CORPORATION OF DELAWARE

FISSURE DETECTOR FOR METALS

Application filed August 10, 1928. Serial No. 298,771. REISSUED

This invention relates to means for detecting inequalities, flaws, fissures, slag or other inclusions and abnormal conditions generally in metal sheets, wires, bars, rails or the like. These faults may either be hidden or at or near the surface and possible of discernment. My invention has also especial adaptation to detection of flaws or fissures in railway rails either before or after being laid on the track, since such fissures frequently cause breakage of rails, derailment, and consequent disaster. I am aware that a method of detecting such fissures has been proposed wherein the magnetic properties of the rail is utilized. According to this prior method the rail is placed in a strong magnetic field which is moved relatively to the rail, and means are employed to detect variations in the field produced by the varying permeability of the rail from point to point. The theory was that a hidden fissure would cause a variation in the number of lines of force passing through the object which could be detected by the resultant variation in the field surrounding the object, but the method failed because variations in such field were produced not only by fissures but often more pronouncedly by other variations in the physical characteristics of the rail, such as hard spots, soft spots, hammer blows, gag marks, etc. Such a method, therefore, failed of its purpose, for it was impossible to distinguish between fissure indications and those due to other causes which do not seriously weaken the rail. This method also is obviously not adapted for testing any metal but only a magnetic metal, such as iron or steel for it is dependent upon the magnetic permeability of the material.

According to my invention, however, instead of passing magnetic lines of force through the body to be tested, I pass a direct electric current of suitable strength as set forth in my application Serial No. 215,980, filed August 27, 1927, and detect variations in the uniformity of the path of the flow of the current through the rail which are produced when the current flows around a flaw or fissure, the current flow, especially if direct current is employed, being comparatively unaffected by hard spots and the like. My present method, therefore, is similar to the prior methods disclosed by me in the above mentioned application, but is distinguished therefrom in that according to the present method I avoid the necessity of using the detector contacts on the rail. After repeated experiments and actual tests on railways, it was found that good contact of the detector brushes of the rail on laid track was difficult to obtain uniformly, some rails having a tough insulating coating thereon which interfered seriously with the high precision necessary in the accurate detection of the fissures. According to my present invention, I dispense with the necessity for employing detector brushes to pick up the potential drop variations and instead of such contact method I place near the rail through which current is being passed, a member, such as a wire or coil of wire, which is responsive to variations in the magnetic field surrounding the conductor caused by the passage of current therethrough. Said member may be connected directly or through an amplifying system to the indicator or recorder. As such coil and conductor are moved relatively, the coil will cut the lines of force surrounding the conductor produced by the current flowing therethrough and hence a small electro-motive force will be induced in the coil. This will always have a more or less alternating characteristic, whether the primary current is alternating or D. C. The wire or coil is placed so that the wires thereof extend generally parallel to the direction of the flow of current in the conductor, so that the magnetic lines of force pass through the coil or loop. As long as the field around the conductor is uniform, the flow of the current induced in the coil will be uniform, but any variations in the field will immediately induce a variation in the said electromotive force in the coil which can be detected. Provided the rate of current flow is constant and the relative speed constant the only condition that can produce a variation in the field is a change in the path of the current through the conductor. In an ordinary railroad rail, such a change in the path can only be produced by a flaw or a rail joint, crossover or the like. I further provide means for preventing variations in the supply current or change in the speed of movement of the detector coils from affecting the indications given by the detector. Other objects of the invention will become apparent from the following more detailed description.

Referring to the drawings in which several preferred forms of the invention are illustrated, Fig. 1 is a diagrammatic side view of the test car chassis with one form of my invention mounted thereon.

Fig. 2 is a plan view of the test sled or slide which rests on the rail under the car, showing the revolving armatures used as the detector coils in this form of the invention.

Fig. 3 is an end elevation of the sled showing a section of the rail ahead.

Fig. 4 is a wiring diagram showing the simplest form of the invention.

Fig. 5 is a second diagram showing the use of compensating detector coils instead of a single wire with ear phones as indicators.

Fig. 6 is a diagram showing one method of eliminating the effects of rail joints on the indicating means.

Fig. 7 is a diagrammatic view of the preferred form of detector coil.

Fig. 8 is a diagram showing the detector coils connected to an amplifying system.

Fig. 9 is a diagrammatic plan view showing one form of recorder or indicator which may be used with my invention.

Fig. 10 is a side view, partly in diagrammatic form, of the invention as applied to testing of wire in a rolling mill.

Fig. 11 is an end elevation of one of the main supply brushes.

Fig. 12 is an end elevation of the apparatus looking in the direction of the arrow in Fig. 10.

Fig. 13 is a detail of the one group of main supply brushes, parts being shown in section.

Referring first to Fig. 4 and Fig. 5, if a current is passed through the bar 1 from generator G and the bar possesses no hidden flaws or fissures, the current will flow uniformly therethrough and, therefore, a uniform magnetic field will surround the bar. If, however, there is a fissure or blowhole at say point 2 in the bar, which lies near the top, the main portion of the current will pass under the fissure as shown by the arrow 3. This will, of course, produce a change in the magnetic field surrounding the bar at that point, weakening the field above the bar. If then the wire 4 of Fig. 4 or the coil or coils 6 and 7 of Fig. 5 are moved relative to the bar near the surface thereof, the E. M. F. or current induced in the same will be varied as point 2 is passed over, which variation may be utilized to give an indication of the flaw. This variation may be amplified in any suitable manner at 4', such as by thermionic tubes (see Fig. 8) to actuate a recorder (Fig. 9) or indicator 5', or the coils may be connected to ear phones 5, which act both as an amplifier and detector. Preferably the coil is provided with a core 6', of material of high magnetic permeability so that the maximum number of lines of force will traverse the coil. My experience up to the present points to the remarkable alloy known as permalloy giving the best results for this purpose. This alloy also becomes saturated at low magnetic densities and when laminated shows low hysteresis losses. Also, I prefer to employ a second coil 7, cross-connected with the coil 6, so as to balance out the effect of variations in the physical speed relatively between the coil and conductor and also any variations in voltage in the main supply current through the same. In other words, if the amount of current flowing through the conductor or the speed of travel varies materially, a change in E. M. F. would be simultaneously generated in each coil, but since the two coils are opposed, this would balance out so that no indication would reach the amplifier, receiver or indicator.

A preferred form of the invention in which an amplifying system is unnecessary is shown in Figs. 1 and 2, this form being especially adapted for testing rails on a laid track. The apparatus is mounted on a test car 8. Under the car and over each rail is suspended a sled or housing 10, which, in operation, rests on or near the rail. Said sled is shown provided with curved sides and ends and has housed therein a pair of armatures 11 and 12, which are normally revolved at good speed by means such as a motor 13 in the car body, connected by flexible shaft 14, to a pinion 15, which meshes with a gear 16 on the common shaft 17 of the two armatures. That portion of the shaft 17' connecting the two armatures, at least, should be of non-magnetic material. Each armature as shown is provided with a laminated wound core and also preferably unwound pole shoes 13' of high permeability, so as to direct a maximum number of lines of force through the armature. The commutator and brush housings 18 are also preferably made of non-magnetic material.

As in the case of the two coils 6 and 7, the armatures are cross-connected so that current will only pass through the system when the E. M. F. of one armature varies with respect to the E. M. F. of the other armature, thus cancelling out the effect of variations in the supply voltage, speed, etc. By revolving the armatures at high speed an indication of a flaw may be obtained without other amplifying means, for the revolving armature cuts the lines of force rapidly and produces a sufficient current to properly actuate the relay coils or the indicator devices.

The sled may be raised and lowered by means of the bell crank lever 27 which is connected to the bar 28, from which the sled proper is supported on rods 29, coil springs 30 being shown to press the sled against the track, thus maintaining the armatures a constant distance above the rail. Bell crank lever 27 is shown as operated by link 31 connected to hand lever 32. A canopy or top 33 is shown as overlying the body of the sled (see Fig. 3) so as to keep out rain and foreign matter and also shield the set from stray magnetic or electric fields. The sled is provided with extending ends 20, each of which supports the main supply brushes 21, 22.

Each of said ends is also shown as carrying an auxiliary brush 23 which contacts with the rail. The purpose of said brush 23 is to temporarily paralyze the indicator when a rail joint is passed over, so that the rail joints will not be confused with the fissures. In this system (Fig. 6) the two brushes 23, 23' are shown as connected to a relay magnet 24, which, when excited, attracts armature 25 and opens switch 26. Said switch is in circuit with the ear phones 5 or other indicator, so that at this time the circuit to the same is open. When both brushes 23 and 23' are on the same rail, little or no current will flow through relay 24 on account of the low resistance of the rail, but when a rail joint is encountered, the resistance is sufficient to cause enough current to flow through the relay magnet to attract the armature 25 and thus break the circuit to the indicator. Said relay may also operate any suitable rail counting device 117 as shown in my prior application 215,980.

Fig. 7 shows one form of detector coil in which the coil is wound around a core 34 of high permeability, connecting end pieces or laterally enlarged extensions 35.

As stated, the coils may be connected with a thermionic amplifying system similar to that employed in my prior application No. 215,980. As shown in Fig. 8 two pairs of cross-connected coils 6 and 7, 6' and 7' are connected to the grid 140' of the first tube 140 and a number of amplifying tubes employed to operate relays for actuating an indicator. The purpose of the two pairs is to balance out the possible effect of the residual magnetism in the rail. As shown, tubes and relays of different degrees of sensitivity are employed so that rail joints may be distinguished from flaws and the relative size of the flaw indicated. The whole arrangement is, of course varied to suit the conditions and also the character of the primary current and secondary indications.

The intermediate amplifying tubes 100—101 are shown as of the improved screen grid type, which has in addition to the usual grid, filament and plate, a screen 102 connected as shown to a separate battery 103. The last tube 104 has the plate thereon connected to a plurality of relays 105, 106, 107 for controlling the indicator or recorder proper, which is preferably in the form of a plurality of marking pen magnets 111, 112, 113 which record on a continuously advanced strip of paper P (see Fig. 9). In this form of the invention a separate rail joint relay 108 is employed which controls the rail joint marking pen. Said relay is connected with preferably a separate set of amplifying tubes 109—110, which have a less amplifying coefficient than tubes 100—101. The grid 109' of tube 109 is shown as connected in parallel with the grid of tube 101 of the main group, and the plate 110' of the last tube 110 is connected to the rail joint relay 108. The respective pen relay contacts are shown as connected to the respective pen magnets 111, 112, 113, while the rail joint relay is connected to the rail joint marking pen magnet 114. Preferably the winding 115 for the other rail is mounted to actuate the same armature 116 as the winding 114 but in the opposite direction so that on the chart the rail joints will appear as a line first in one direction and then in the other as shown in Fig. 9. In this figure there are three flaw magnets 111, 112 and 113 and one joint magnet 114 for the left hand rail and three flaw magnets 111', 112' and 113' and a joint magnet 115 for the right hand rail, but only one joint pen 114'. Coil 120 in Fig. 8 is the operating coil of the rail joint counter 117.

As stated above, the separate relays are wound or adjusted for different degrees of sensitivity. Relay magnet 108 in this instance is relatively insensitive so that it is actuated only by rail joints or other gaps in the rail. The other relays are progressively more sensitive. For a small flaw only one relay 105, for instance, is designed to be operated, for a large flaw two relays 105 and 106, and for a serious flaw three relays 105, 106 and 107. Thus the indications on the chart show at a glance the relative size of the fissure as well as its presence.

Referring to Fig. 9, the rail joints in the left hand rail are shown at $a$, $b$, $c$ and in the right hand rail at $d$ and $e$, because the pen 116 of coils 114 and 115 is only actuated by such. A very small fissure is shown in the left hand rail at $f$, because only the supersensitive relay 105 for pen magnet 111 is actuated by such a small flaw. A larger flaw is indicated at $g$ in the left hand rail and a very serious flaw at $h$ in the left hand rail and at $h'$ in the right hand rail. It will be understood that the chart P of Fig. 9 is advanced by any suitable means in accordance with the rate of movement of the test car on which the apparatus is mounted, such as shown in my aforesaid prior application, Serial No. 215,980.

It is obvious that my system is equally well adapted for testing any metallic wire or rod and in Figs. 10, 11 and 12 I show the preferred form of my invention for testing wire as it passes through the rolling mills. The wire is shown at 50 and is represented as moving rapidly in the direction of the arrow between the rollers 51, 52. Current is supplied to the wire by the main brushes 53, 54. Between said brushes are placed a pair of spaced detector coils 55, 56 which, in this instance, surround the wire to some predetermined extent. I also prefer to place beyond the brushes 54 a second pair of detector coils 55', 56', for a purpose hereinafter described. All of said coils are preferably split or open at one side together with the permalloy centers 57 and are mounted on hinged frames 58, 59 so that they may be opened as shown in dotted lines in Fig. 12, the two frames being hinged at the point 60. Frames 58 and 59 are each provided with ears 61, 62 extending beyond the pivot 60 and connected to a spring 63 which normally tends to pull the ears together as shown in dotted lines in Fig. 12 and thus open the coils. A pair of pivoted links 65, 65' are shown as hinged to ears 61, 62, forming a pantograph. The outer end of the pantograph is shown as slidable in a slot 67' in bracket 67 and is normally held forwardly, as shown in Fig. 12 by trip 68, secured to a shaft 69. When said trip 68 is revolved upwardly as shown in dotted lines, the spring immediately opens the coils as shown in Fig. 12, thus releasing the wire and placing the coils where they will not be harmed by the loose end of the wire as it flies through the apparatus.

Resting on the wire at the right side of the apparatus is shown a wheel 70 which is revolved by the passage of the wire thereunder. Said wheel is shown as driving through suitable bevel gearing 71, a shaft 72 which operates through flexible shaft 72', a linear measuring device 73 so that if a flaw is encountered the section of wire it lies in may be readily located. Said shaft is also shown as operating a speed indicator 74. The wheel 70 is journalled on a bell crank lever 75 pivoted on shaft 76. The upwardly extending arm 77 of the bell crank lever normally makes contact with a switch 78. When, therefore, the wire passes from under the wheel 70 it drops down, moving arm 77 out from engagement with switch 78. Switch 78 is in the main circuit of the supply brushes so that means are thus provided for opening the main supply current when the end of the wire is reached, thus preventing severe sparking at the main supply brushes.

Also I prefer to connect the speed indicator 74 with a resistance or other means for varying the amount of supply current. I find it advantageous to send as much current as possible through the wire and this amount may, of course, be increased with the speed of the wire, since at high speed the wire will not have time to heat up and may carry many times the current it could carry if at rest. I, therefore, provide means for increasing the current with the speed or, stated another way, for decreasing the current as the speed decreases, thus providing for maximum operating efficiency under all conditions without the danger of overheating the wire. To this end I have shown the speed indicator as operating a rheostat or variable resistance 40, the movable arm 41 in the rehostat being connected to or actuated by the speed indicator, so when the speed is low a much less current is sent through the wire than when the speed is great.

Preferably also I provide means to move the main brushes out of the path of the free end of the wire, when the end of the wire is reached as well as the detector coils. For this purpose I have shown the main supply brushes as mounted for sliding in four radial slots 80 in a supporting frame 81 so that the brushes may be moved into or out of contact with the wire 50 (Fig. 11). Each brush has a pin 82 thereon which connects to the slot adjacent the brush and bears on one portion of a four-part cam 83. When the cam is revolved counter-clockwise, i. e., in the direction of the arrow in Fig. 11, it will readily be seen that all four brushes will be withdrawn from contact with the wire 50. The brushes are normally held against the wire by a continuous spring band 84 (see Fig. 15). The brushes are also preferably placed at a slightly different angle to the wire as shown.

Said cam 83 is preferably revolved to withdraw the brushes by the dropping of the roller 70 as it reaches the end of the wire, which operation also performs the other functions described above. As shown, a link 85 is pivoted to the cam which is connected to the lever 86 pivoted at 87. The outer end of said cam is in turn connected to a link 88 which is pivoted to bell crank lever 89. Said lever in turn is shown as secured to shaft 89' which is operated from shaft 76 through bevel gears 76'. At its lower end, lever 89 also operates the bell crank lever 68 by a pin slot connection 90 so that the main supply brushes are withdrawn at the same time that the split coils are open to prevent damage to the apparatus.

The second pair of split coils 55', 56' may be constructed and operated in the same manner as the main test coils. These coils, however, it should be noted, are placed around the wire at a point where no current is passing therethrough. Hence, whenever current is induced in these coils it is produced by the residual magnetism in the wire. The record of these coils may be compared with the record of the main coils to obtain additional data as to the interior construction of the wire, such as the presence of hard-spots. crystallization, etc. Such variations in the interior construction has a material effect on the magnetic field produced by the magnetism of the wire itself but has little or no effect on the flow of current therethrough.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting flaws within electrical conductors, which consists in passing direct current therethrough, cutting the lines of force surrounding the conductor by moving said conductor and two other conductors relatively, said last two conductors being out of contact with said first conductor, and comparing the E. M. F.'s induced in said last two conductors.

2. The method of detecting flaws within electrical conductors, which consists in passing direct current therethrough, cutting the lines of force surrounding the conductor by moving said conductor and two other conductors relatively, said last two conductors being out of contact with said first conductor and so arranged as to pass in succession over said first conductor substantially parallel to the direction of flow of current, and comparing the E. M. F.'s induced in said last two conductors.

3. The method of detecting flaws within electrical conductors, which consists in passing direct current therethrough, cutting the lines of force surrounding the conductor by moving said conductor and two other conductors relatively, said last two conductors being out of contact with said first conductor and arranged in tandem substantially parallel to the direction of flow of current, and opposing against each other the E. M. F.'s induced in said last two conductors.

4. The method of detecting flaws within electrical conductors, which consists in passing current therethrough, cutting the lines of force surrounding the conductor by moving said conductor and two other conductors relatively, said last two conductors being out of contact with said first conductor and arranged in tandem substantially parallel to the direction of flow of current, opposing against each other the E. M. F.'s induced in said last two conductors, and maintaining a constant distance between the first conductor and said last two conductors.

5. Apparatus for detecting flaws within electrical conductors comprising, in combination, means for passing a direct current through the conductor to be tested, a pair of opposed conductors out of contact with but adjacent to said first conductor and movable relative to said first conductor, and means for indicating the E. M. F.'s induced in said pair of conductors.

6. Apparatus for detecting flaws within electrical conductors comprising, in combination, means for passing a direct current through the conductor to be tested, a pair of opposed conductors out of contact with but adjacent to said first conductor and movable relative to said first conductor, said pair of conductors being arranged to pass over said first conductor successively substantially parallel to the direction of flow of current, and means for indicating the E. M. F.'s induced in said pair of conductors.

7. Apparatus for detecting flaws within electrical conductors comprising, in combination, means for passing a direct current through the conductor to be tested, a pair of opposed conductors out of contact with but adjacent to said first conductor and movable relative to said first conductor, said pair of conductors being arranged to pass over said first conductor successively substantially parallel to the direction of flow of current, and means for indicating the differential E. M. F.'s induced in said pair of conductors.

8. Apparatus for detecting flaws within electrical conductors comprising, in combination, means for passing a direct current through the conductor to be tested, a pair of opposed conductors out of contact with but adjacent to said first conductor and movable relative to said first conductor, said pair of conductors being arranged in tandem along the line of movement so as to pass over said first conductor successively substantially parallel to the direction of flow of current, and means for indicating the E. M. F.'s induced in said pair of conductors.

9. Apparatus for detecting flaws within electrical conductors comprising, in combination, means for passing a direct current through the conductor to be tested, a pair of opposed induction coils out of contact with but adjacent to said conductor and movable relative thereto, said coils being arranged in tandem to pass over said first conductor successively substantially parallel to the direction of flow of currents, and means for indicating the differential E. M. F.'s induced in said coils.

10. Apparatus for detecting flaws within electrical conductors comprising, in combination, means for passing a current through the conductor to be tested, a pair of opposed conductors out of contact with but adjacent to said first conductor and movable relative to said first conductor, means for maintaining a constant distance between the first conductor and said pair of conductors, said pair of conductors being arranged to pass over said first conductor successively substantially parallel to the direction of flow of current, and means for indicating the E. M. F.'s induced in said pair of conductors.

11. Apparatus for detecting inequalities in rails and the like, comprising the combination with means for passing a primary current through the conductor to be tested, of a secondary conductor movable relatively along the conductor, means responsive to variations of current in said secondary conductor for giving the indications, and means for preventing the actuating of said means by the equipment such as rail joints and like interruptions.

12. Apparatus for detecting flaws in electrical conductors comprising the combination with means for passing a primary current through the conductor to be tested, of a test coil mounted adjacent said conductor, means for revolving said coil, means for also moving said coil along said conductor relatively, and indicating means actuated by variations in the current generated in said coil.

13. Apparatus for detecting flaws in electrical conductors comprising the combination with means for passing a primary current through the conductor to be tested, of a pair of opposed coils mounted adjacent said conductor, means for revolving said coils, means for also moving the same along said conductor relatively, and indicating means actuated by variations in the resultant E. M. F. generated in said coils.

14. A flaw detector for rails comprising the combination with a car, of means thereon for passing a current between spaced points on the rail as said car moves along the rail, a pair of opposed coils, means for supporting the same in close proximity to the rail between the points of current introduction thereto, and means for indicating variations in the induced E. M. F. in said coils.

15. A flaw detector for rails comprising the combination with a car, of means thereon for passing a current between spaced points on the rail, a pair of opposed coils, means for supporting the same in close proximity to the rail between the points of current introduction thereto, means for indicating variations in the induced E. M. F. in said coils, and means for cutting out said indicating means when a rail joint is passed over.

16. A flaw detector for rails comprising the combination with a car, of means thereon for passing a current between spaced points on the rail as said car moves along the rail, a pair of opposed coils, means for supporting the same in close proximity to the rail between the points of current introduction thereto, means on the car for continuously revolving said coils, and means for indicating variations in the induced E. M. F. in said coils.

In testimony whereof I have affixed my signature.

ELMER A. SPERRY.